(12) United States Patent
Fleming et al.

(10) Patent No.: US 6,388,795 B1
(45) Date of Patent: May 14, 2002

(54) PHOTONIC LAYERED MEDIA

(75) Inventors: James G. Fleming; Shawn-Yu Lin, both of Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 0 days.

(21) Appl. No.: 09/569,985

(22) Filed: May 11, 2000

(51) Int. Cl.$^7$ ................................................ G02F 1/01
(52) U.S. Cl. ..................... 359/240; 359/129; 359/131
(58) Field of Search ............................... 385/129, 130, 385/131; 359/240

(56) References Cited

U.S. PATENT DOCUMENTS

| | | | | |
|---|---|---|---|---|
| 5,739,796 A | * | 4/1998 | Jasper, Jr. et al. | 343/895 |
| 5,740,287 A | * | 4/1998 | Scalora et al. | 385/6 |
| 5,852,304 A | * | 12/1998 | Suzuki et al. | 257/17 |
| 5,990,850 A | * | 11/1999 | Brown et al. | 343/912 |
| 6,058,127 A | * | 5/2000 | Joannopoulos et al. | 372/92 |
| 6,134,043 A | * | 10/2000 | Johnson et al. | 359/237 |

* cited by examiner

*Primary Examiner*—Georgia Epps
*Assistant Examiner*—Tim Thompson
(74) *Attorney, Agent, or Firm*—Brian W. Dodson

(57) ABSTRACT

A new class of structured dielectric media which exhibit significant photonic bandstructure has been invented. The new structures, called photonic layered media, are easy to fabricate using existing layer-by-layer growth techniques, and offer the ability to significantly extend our practical ability to tailor the properties of such optical materials.

18 Claims, 5 Drawing Sheets

PHOTONIC LAYERED MEDIA

GOVERNMENT RIGHTS

This invention was made with Government support under Contract DE-AC04-94AL85000 awarded by the U.S. Department of Energy. The Government has certain rights in the invention.

FIELD OF THE INVENTION

The present invention relates generally to structured dielectric materials exhibiting photonic bandstructure, and in particular to a new class of three-dimensional photonic layered media.

BACKGROUND OF THE INVENTION

The capabilities and design of optical elements, meaning such elements are capable of controlling the propagation of electromagnetic radiation ranging from microwaves through the ultraviolet, depends in large measure on utilizing, and ideally controlling, the optical properties of materials. In traditional optics, optical elements are made of curved pieces of such materials as glass, whose curve and intrinsic optical properties determine the effect of the optical element.

A recently-developed class of optical materials is that of photonic crystals or photonic lattices. The examples produced to date have typically been composed of structured materials having periodically varying dielectric constants, the space group of the periodicity being quite simple (simple cubic, fcc, bcc, diamond, etc.) Such materials have bulk optical properties which are primarily determined by multiple scattering and interference effects due to the periodic dielectric constant.

In many ways the photonic bandstructure resulting from the periodically varying dielectric constant is analogous to the electronic bandstructure observed in crystalline solids. The motion of electrons in solids is governed by a set of momentum-energy dispersion relationships called the electronic bandstructure. Electronic bandstructure is traditionally described using such concepts as reciprocal space, Brillouin zones, dispersion relations, Bloch wave functions, and electronic bandgap, all of which appear to have counterparts in the motion of photons through periodically structured dielectric materials.

An interesting and useful optical behavior appears in periodic structured dielectric materials which are analogous to semiconductor materials. In such materials, there exist photon modes, characterized by photon energy, momentum, and polarization, which cannot propagate within the material, that is, these modes undergo self-destructive interference on interacting with the spatially periodic dielectric constant. If there is a range of photon energies for which no propagating modes exist, the material is said to exhibit a complete photonic bandgap, in analogy with the electronic bandgap in a semiconductor. Formation of a complete photonic bandgap in periodically structured dielectric materials where the periodicity appears in only one direction can occur with vanishingly small dielectric constant variation. In multiple dimensions, however, the range of variation of the dielectric constant of the medium must be rather large (usually greater than about 2) to produce a complete photonic bandgap.

Even when the dielectric constant of a medium does not vary sufficiently to result in a complete photonic bandgap, the spatial variation will often significantly alter the photon dynamics from their equivalent bulk values. Even if this occurs only over a small range of energies, this effect, and the accompanying large optical dispersion in that photon energy range, can be beneficially used in optical elements.

Applicants will use the term "photonic layered medium" to describe any dielectric structure comprising an ordered layer of structured dielectric layers in which the density of propagating photon modes or the effective refractive index of the structure varies, at some photon energy, by more than about 10% from the equivalent quantities in a homogeneous dielectric material having the same volume averaged composition. Note that although periodic photonic crystals are photonic layered media, the "generic" photonic layered medium is not a periodic photonic crystal. The intent here is that a photonic layered medium should have dielectric properties which are the result of the spatially variable dielectric constant. Thus, it is not simply a structured dielectric material, but rather is a novel construct with significant utility as discussed earlier.

Theoretical comparison of ideal and defective infinite periodic photonic crystals suggest that minor variations in structural dimensions, materials, or symmetries, including finite-size effects, cause only minor changes in the expected behavior of the ideal structure. As a result, for the purposes of this application structures which are related to a precisely described structure by processing effects, such as dimensional tolerances, interdiffusion, interfacial effects, and finite-size effects are to be considered as equivalent to the structure described.

Periodic photonic crystals have been limited to a small number of rather simple, high-symmetry materials. An early example of a three-dimensional periodic structured dielectric material consisted of a slab of optical material penetrated by a matrix of drilled holes so positioned and oriented (along the (110), (011), and (101) axes of a slab with a (100) surface) so as to produce a pair of interpenetrating connected lattices of diamond symmetry, one consisting of the slab material, and the other consisting of air. This structure is commonly known as Yabonovite, and exhibits a complete photonic bandgap when the dielectric constant of the slab material is sufficiently large.

Another class of periodic dielectric structures which can yield complete photonic bandgaps have been defined by Ho et al, U.S. Pat. No. 5,335,240, issued Aug. 2, 1994, and its continuation-in-part, Ozbey et al, U.S. Pat. No. 5,406,573, issued Apr. 11, 1995, both representing work carried out at Iowa State University. These structures consist of a periodic layered stack of dielectric rods. In each layer the rods are parallel with a constant spacing, and their orientation direction and lateral position varies between layers —often to result in a four-fold periodic repeat distance vertical to the layers of the stack. These are sometimes called woodpile structures. Fan et al, in U.S. Pat. No. 5,440,421, issued Aug. 8, 1995, and its continuation-in-part, Fan et al, in U.S. Pat. No. 5,600,483, issued Feb. 4, 1997, teach a related structures which also exhibits a complete photonic bandgap given sufficiently high dielectric contrast. This structure consists of a stack of structured dielectric layers, where each layer consists of a stratum of a first material having a first dielectric constant and a plurality of parallel grooves filled with a second material having a second dielectric constant. Once the stack of layers is formed, a plurality of parallel channels is etched vertically through the stack, so that the channels are perpendicular to the plane of the layers. These channels must be positioned with two-dimensional periodicity, the result being that the overall structure has three-dimensional periodicity. The cross-section of these channels can be of any shape, but their shape and size is taught as remaining constant as the channels penetrate the layers.

It is extremely difficult to fabricate such apparently simple periodic photonic crystals, particularly where the photonic bandstructure appears in the infrared or visible optical range. They also offer only a very limited range of photonic bandstructures to exploit in devices. Accordingly, it is important to develop new classes of photonic media which can be easily fabricated, preferably using ordinary semiconductor fabrication techniques. It is more favorable if the new classes of photonic media also providing for a wider range of photonic bandstructures for application. This need is at least partially addressed by the photonic layered media of the instant invention.

SUMMARY OF THE INVENTION

A new class of photonic layered media has been developed. These media can be decomposed into a stack of structured layers, which in turn consist of a collection of dielectric segments. The layered photonic media of one implementation of this new class have compact segments in the structured layers, but do not have smooth columns of dielectric passing through the medium. These new structures lend themselves naturally to fabrication using layer-by-layer growth techniques, and allow considerably more flexibility in design and detailed photonic properties than do the prior art periodic photonic crystals.

BRIEF DESCRIPTION OF THE DRAWINGS

FIG. 6 shows a pair of physical implementations of the instant invention.

DETAILED DESCRIPTION

Figure 1:
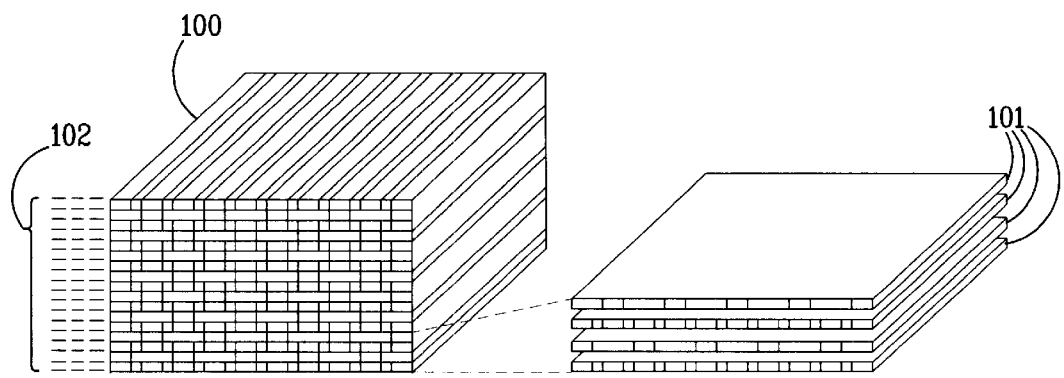
FIG. 1 shows a layered material composed of structured layers as described in the specification.
Figure 2:
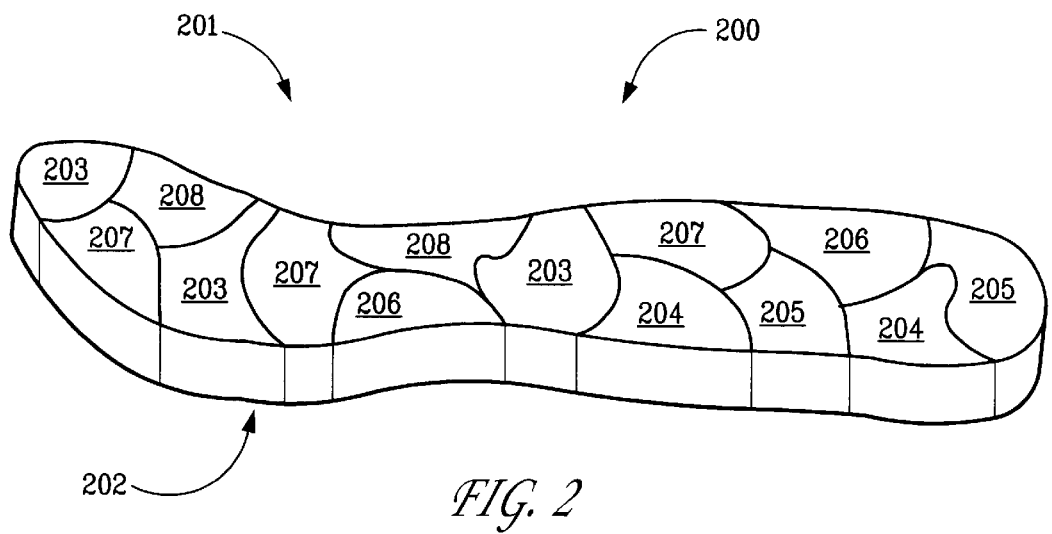
FIG. 2 shows a structured layer composed of maximal segments as described in the specification.

A hierarchy of structural definitions is needed to properly describe the present photonic layered media. A layer (see FIG. 1) is a material body 100 which has a top flat surface of finite extent, a bottom flat surface of finite extent, and an essentially constant thickness between top and bottom surfaces. Body 100 is an organized layer if it is decomposable into a stack of layers 101 whose interfaces are essentially parallel to the top and bottom surfaces of body 100, and are naturally defined by the structure of body 100. That is, body 100 must contain structural discontinuities 102 which define parallel interfaces between layers. We tacitly assume that all such interfaces are used to decompose a body 100 into the stack of layers 101—that is, there remain no layers which are further decomposable.

A layer 200 with a top surface 201 and a bottom surface 202, which belongs to a stack of layers is a structured layer if it consists of a finite collection of segments , where a segment (examples are labeled 203–208) is a connected and isodielectric subset of layer 200 which intersects both the top surface 201 and the bottom surface 202. A useful analogy is that layer 200 is an assembled jig-saw puzzle, and each segment making up layer 200 consists throughout of a single color (dielectric material). Although discrete segments can have the same color, in a structured layer an isodielectric segment cannot touch another isodielectric segment belonging to the same structured layer.

Figure 3A:
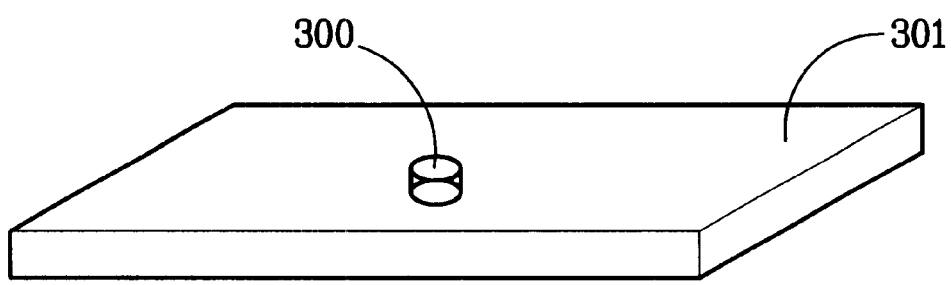
FIG. 3 shows a) a compact segment, and b) a multiply connected compact segment.

A compact segment (see FIG. 3a) is a segment 300 whose lateral extent is less than the finite lateral extent of the layer 301 in which it resides. This is equivalent to the statement that a compact segment does not extend laterally throughout the layer. In the analogy, a compact jig-saw piece is small compared to the size of the puzzle.

Figure 3B:
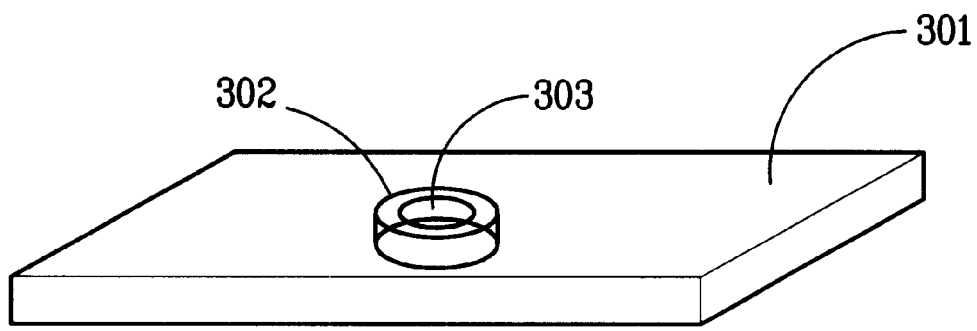

Finally, a multiply connected segment (see FIG. 3b) is a segment 302 in which there exists a simple closed curve contained within the segment which cannot be shrunk to a point while remaining within said segment. In an essentially two-dimensional structure such as a segment in a layer, this means that a multiply connected segment has at least one penetrating hole 303. In the analogy, a multiply connected segment is a jig-saw piece which has at least one hole penetrating from the top surface to the bottom surface, with a different segment residing in the hole. A multiply connected segment can be compact or not.

Figure 4:
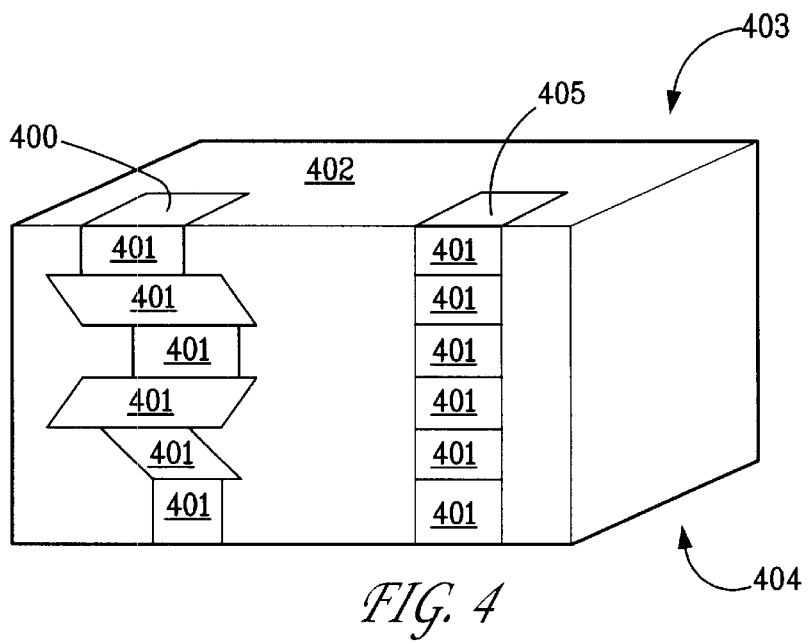
FIG. 4 shows a layered material comprising a smooth column and a non-smooth column.

Structure perpendicular to the layers is important to the definition of the instant invention as well. As shown in FIG. 4, a column 400 is a stack of isodielectric segments 401 within a layered material 402, including only one segment per structured layer in 402, such that a continuous path can be brawn from the top surface of the uppermost proper structural layer 403 to the bottom surface of the lowermost proper structural layer 404 without leaving the segments making up said column. In essence, a column is a single piece of dielectric material whose cross-sectional area is a function of the vertical position within the layered material. Usually the lateral surfaces of a column will not be smooth, but will exhibit discontinuities, or discontinuities of the normal vector to the lateral surfaces. A smooth column 405 is a column whose lateral surfaces are all smooth.

Figure 5:
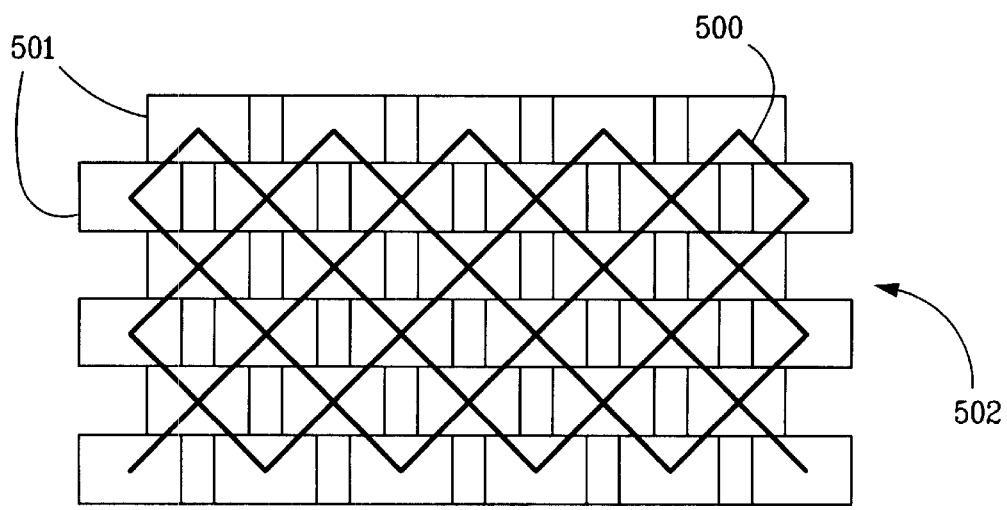
FIG. 5 shows a medium-filling network in a layered material.

A final level of structure required to describe a set of implementations of the present invention is more global in nature. As shown in FIG. 5, a network 500 is a connected set of isodielectric segments 501 within a layered material 502. (Those segments with line 500 drawn through them are elements of network 500.) If the union of a network 500 and all segments which adjoin segments belonging to the network equals the whole of the layered material, as in FIG. 5, then the network 500 is called a medium-filling network.

An organized layer will always support multiple networks. Two networks in an organized layer are called distinct if they do not share any segments. Finally, two discrete medium-filling networks intertwine if every segment belonging to one of the networks adjoins a segment belonging to the other network.

A photonic layered medium according to the present invention is, in a first implementation, an organized layer comprising optical dielectric materials distributed so that the organized layer can be decomposed into a stack of structured layers such that the structured layers comprise segments and compact segments, but so that the organized layer has no smooth columns.

An important subgroup of said first implementation is that where a subset of the segments define a spatially periodic pattern within the organized layer. Another is where a subset of the compact segments define a spatially periodic pattern within the organized layer. Note that a subset can be the entire collection, whereas a proper subset must contain fewer elements that the entire collection.

An additional subgroup of said first implementation is that where a subset of the segments are multiply connected segments. Another is where a subset of the compact segments are multiply connected segments. These structures can also have the spatially periodic structures referred to above, either independently, or such that the subset making up the spatially periodic pattern is the same as the subset of multiply connected segments.

A second implementation of the present invention consists of an organized layer after the first implementation, but which also comprises a first medium-filling network. The influence of such networks is to increase the coupling between photons and the spatially variable dielectric constant in the medium, thereby requiring less dielectric contrast to achieve a given level of photonic bandstructure effect.

Again, there are subimplementations in which, for example, the first medium-filling network comprises multiply connected segments or compact segments, and where the first medium-filling network consists of multiply connected segments and/or compact segments. A second medium-filling network can also exist. If so, the networks can be distinct, overlapping, or intertwined. If intertwined, the union of the two networks can be required to be equal to the entire organized layer. More complex levels of structure are in principle possible, but the above serve to define the present invention adequately.

It was mentioned above that minor variations in structural dimensions, materials, or symmetries, including finite-size effects, cause only minor changes in the expected behavior of the ideal structure. Hence, structures which are related to a precisely described structure by minor variations, such as dimensional tolerances, interdiffusion, interfacial effects, and finite-size effects, are to be considered valid implementations of the instant invention. In addition, a dielectric structure which can be embedded segment by segment (including not only shape and position, but also optical material) into an organized layer which is a valid implementation of the instant invention will itself be considered a valid implementation of the instant invention. (Such embedding is roughly equivalent to the statement that one can obtain the dielectric structure from the organized layer by whittling pieces away from the organized layer. Note that segments which are cut by the whittling need only overlap with those in the organized layer.)

Consider briefly the periodic photonic crystal structures described earlier in the above description. Yabonovite does not qualify as an organized layer consisting of a stack of structured layers, so it is not included in the definition of the instant invention.

In contrast, the structures taught by Ho et al and by Ozbey et al are clearly organized layers which consist of structured layers. However, they do not contain any compact segments, nor do they include multiply connected segments. As compact segments are required in the instant invention, these photonic crystals are not included in the instant invention.

The structures taught by Fan et al are organized layers which consist of structured layers, and which also comprise compact segments. For example, some segments formed by etching a hole vertically through a layer are clearly compact. Further, although their illustration does not show an example, the fabrication process described is capable of making a structure having multiply connected compact maximal segments. However, all Fan-like structures have smooth columns, and hence are not included in the instant invention. In fact, Applicants do not know of any previous photonic crystals which are included in the instant invention, which is thus distinct from earlier work.

Figure 6A:
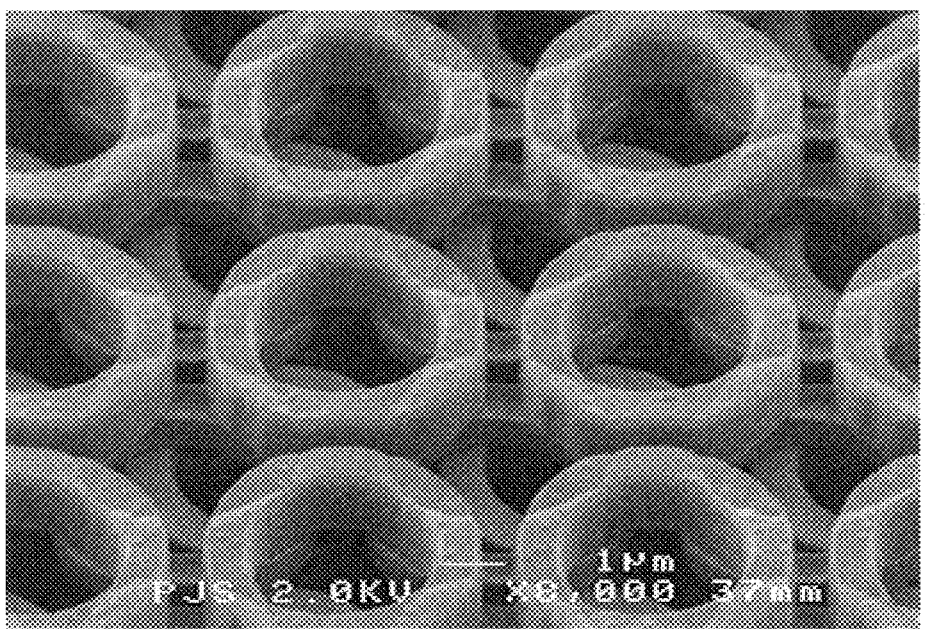
FIG. 6a shows a periodic lattice of dielectric rings.

Applicants have fabricated for demonstration and testing several specific implementations of the instant invention, executed in polysilicon using previously described techniques. Two of these appear in FIG. 6. FIG. 6a shows a photonic layered medium according to the instant invention which consists of a fourfold-periodic stack of structured layers. The structured layers each consist of a simple cubic array of polysilicon ring segments. These rings are about 0.8 microns thick, with a roughly square cross-section, and are some 4 microns in outer diameter. The lattice constant of the simple cubic array is about 4.5 microns, so that neighboring rings do not touch, but rather are separated by segments consisting of air.

Figure 6B:
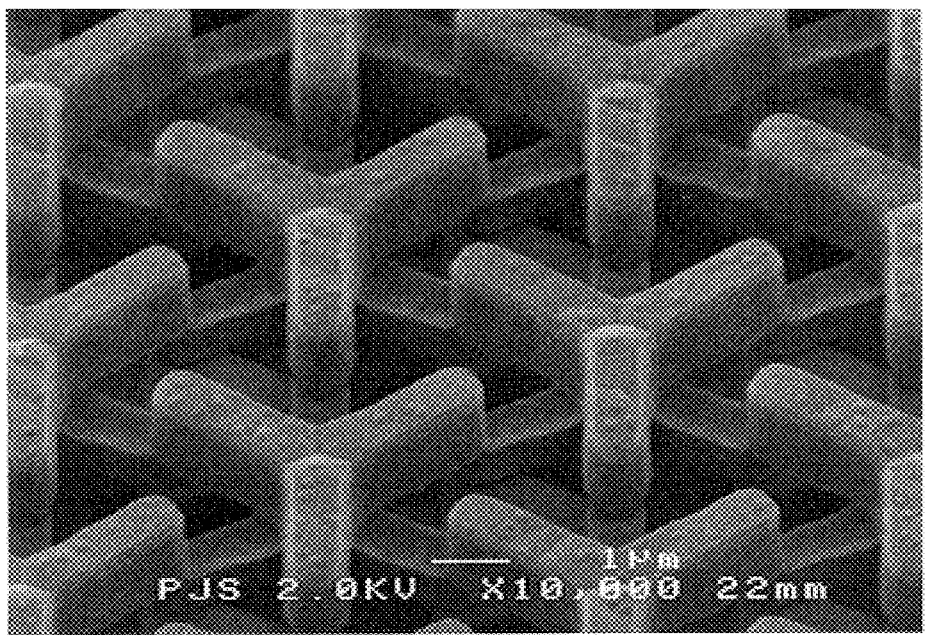
FIG. 6b shows a periodic lattice of dielectric trifolds. In both cases, the material used is polysilicon and the primary photonic bandstructure effects appear in the 6–9 micron wavelength region.

FIG. 6b shows a photonic layered medium according to the instant invention which consists of a three-fold periodic stack of structured layers. The structured layers each consist of a triangular lattice of polysilicon trifold segments (see FIG. 6b). These trifolds are about 0.8 micron in thickness, with the trifold arms having roughly the same width. The trifolds can be circumscribed by a 4 micron circle, and are separated by about 5 microns, so that neighboring trifolds do not touch.

Figure 7:
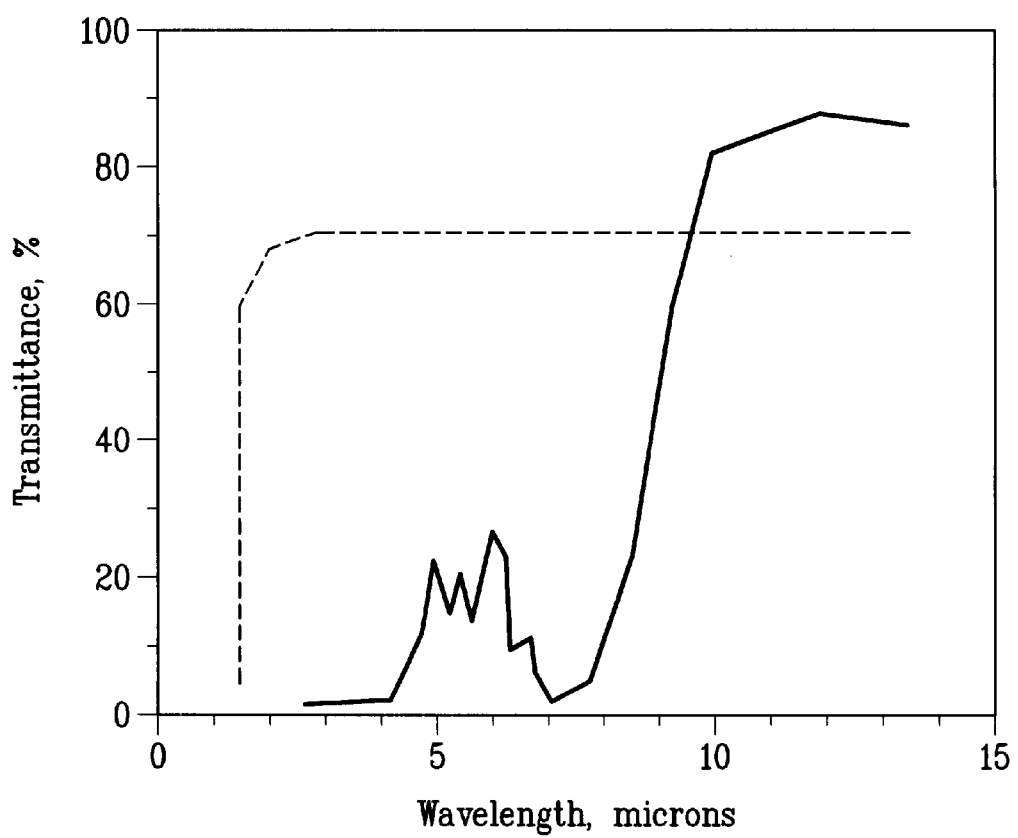
FIG. 7 shows transmittance of incident radiation through an 8—layer structure of the type shown in FIG. 6b as a function of the wavelength of the incident radiation. The solid line is the experimental result, while the dashed line show the prediction of a simple model which ignores photonic bandstructure effects.

FIG. 7 shows the optical properties of an 8 layer structure of the type illustrated in FIG. 6b. The structure thickness is about 6.4 microns, so that away from the silicon electronic bandgap, transmission should rise rapidly to the value set by Fresnel reflection from an equivalent surface. The majority of the surface of this structure is occupied by a silicon surface, so that in the absence of photonic bandstructure effects reflection from the structure should be similar to that from a simple silicon surface. The refractive index of silicon in the tested wavelength range is about 3.5, so that the transmission should be near 70%. The predictions of this simple model, which excludes all photonic bandstructure effects, is indicated by the dashed line in FIG. 7.

The transmittance (the solid line in FIG. 7) rises rapidly from essentially zero at small wavelengths as expected, but then plunges down again, becoming below 10% in the wavelength region between roughly 6.5 and 8 microns. It then rapidly rises, eventually attaining values considerable larger than the expected 70%. Both of these discrepancies are the result of photonic bandstructure effects—most clearly indicating at least a significant reduction in photon states available for transport in the 6–9 micron region. This result is consistent with the design structure.

A new class of photonic layered media have been introduced in a number of specific implementations. Examples of these structures have been fabricated of polysilicon and have been found to have significant photonic bandstructure effects in the mid-infrared, exactly as designed. The specific implementations discussed above and realized experimentally are not intended to limit the scope of the present invention—that scope is intended to be set by the claims interpreted in view of the specification.

DEFINITIONS

Layer—a material body having a finite top surface, a finite bottom surface, and an essentially constant thickness between top and bottom surfaces.

Organized layer—a layer which is decomposable into a stack of layers whose interfaces are essentially parallel to the top and bottom surfaces of the organized layer.

Decomposable—a body is decomposable into a stack of layers if the structure of the body contains material discontinuities which define the interface between adjacent layers.

Structured layer—a structured layer consists of a finite collection of segments, such that said structured layer cannot be decomposed into a stack of sublayers whose interfaces are essentially parallel to the top and bottom surfaces of the structured layer. No segment in the finite collection can adjoin any other isodielectric segment in the finite collection.

Segment—a connected and essentially isodielectric subset of a single structured layer which intersects both the top and bottom surfaces of said layer.

Isodielectric—two materials are isodielectric if they have essentially identical dielectric properties in a photon energy range of interest.

Compact segment—a segment whose lateral extent is less than the finite lateral extent of the layer in which it resides.

Multiply connected segment—a segment in which there exists a simple closed curve contained within the segment which cannot be shrunk to a point while remaining within said segment.

Column—a stack of isodielectric segments which enclose a continuous path within an organized layer reaching from the top surface of the uppermost structural layer to the bottom surface of the lowermost structural layer Smooth column—a column whose cross sectional shape and area (i.e., shape and area parallel to the surfaces of the proper structural layers) is substantially continuous across all layer interfaces in a layered material.

Network—A connected set of isodielectric segments within an organized layer.

Medium-filling network—A network such that the union of the network and all adjoining segments equals the organized layer.

Distinct networks—two networks in an organized layer are distinct if they do not share any segments.

Intertwining—two distinct medium-filling networks intertwine if every segment belonging to one of the networks adjoins a segment belonging to the other network.

What is claimed is:

1. A photonic layered medium, comprising an organized layer comprising optical materials distributed so that the organized layer can be decomposed into a stack of structured layers, said structured layers comprising segments and compact segments, but such that the organized layer has no smooth columns.

2. The photonic layered medium of claim 1, such that a subset of the segments define a spatially periodic pattern within said medium.

3. The photonic layered medium of claim 1, such that a subset of the compact segments define a spatially periodic pattern within said medium.

4. The photonic layered medium of claim 1, wherein some of the segments are multiply connected segments.

5. The photonic layered medium of claim 4, such that a subset of the multiply connected segments define a spatially periodic pattern within said medium.

6. The photonic layered medium of claim 1, wherein some of the compact segments are multiply connected.

7. The photonic layered medium of claim 6, such that a subset of the multiply connected compact segments define a spatially periodic pattern within said medium.

8. The photonic layered medium of claim 1, further comprising a first medium-filling network.

9. The photonic layered medium of claim 8, wherein the first medium-filling network comprises multiply connected segments.

10. The photonic layered medium of claim 8, wherein the first medium-filling network comprises compact segments.

11. The photonic layered medium of claim 8, wherein the first medium-filling network consists of compact segments.

12. The photonic layered medium of claim 8, wherein the first medium-filling network consists of multiply-connected compact segments.

13. The photonic layered medium of claim 8, further comprising a second medium-filling network.

14. The photonic layered medium of claim 13, wherein the first and second medium-filling networks are distinct.

15. The photonic layered medium of claim 14, wherein the first and second medium-filling networks are intertwined.

16. The photonic layered medium of claim 15, wherein the union of the first medium-filling network and the second medium-filling network is equal to the entire photonic layered medium.

17. A photonic layered medium, consisting of a collection of segments comprising optical materials organized into a stack of structured layers, so that the organized collection can be embedded into a photonic layered medium according to claim 1.

18. A photonic layered medium, consisting of a collection of segments comprising optical materials organized into a stack of structured layers, so that the organized collection can be embedded into a photonic layered medium according to claim 4.

* * * * *